United States Patent
Ariza et al.

Patent Number: 6,017,267
Date of Patent: Jan. 25, 2000

[54] RESURFACING TOOL

[76] Inventors: Juan Ariza; Juan Jose Serrato, both of 5986 Canal St., Riverside, Calif. 92509

[21] Appl. No.: 09/007,825

[22] Filed: Jan. 15, 1998

[51] Int. Cl.[7] .................................................. B24D 15/04
[52] U.S. Cl. ............................ 451/523; 428/119; 428/192
[58] Field of Search .................................... 451/523, 524, 451/528, 531, 555, 558; 428/119, 192, 131

[56] References Cited

U.S. PATENT DOCUMENTS 1,067,280  7/1913  Smilovetz ................................ 451/524
3,114,352  12/1963  Mathisen ................................ 451/523

FOREIGN PATENT DOCUMENTS 7609814  3/1978  Netherlands ............................ 451/523

*Primary Examiner*—Alexander Thomas

[57] ABSTRACT

A resurfacing tool including a base member defined by a planar portion having a generally rectangular configuration. The planar portion has opposed short edges and opposed long edges. A pair of branched portions are integral with the opposed long edges of the planar portion of the base member. A pair of emery cloths are secured within spaces of the pair of branched portions.

5 Claims, 2 Drawing Sheets

RESURFACING TOOL

BACKGROUND OF THE INVENTION

1. Field of the Invention

The present invention relates to a resurfacing tool and more particularly pertains to reshaping and resurfacing edges of windshield wiper blades, squeegees, dustpans, and the like with a resurfacing tool.

2. Description of the Prior Art

The use of windshield blade cleaners is known in the prior art. More specifically, windshield blade cleaners heretofore devised and utilized for the purpose of cleaning windshield blades are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,708,924 to Prunchak discloses a windshield blade reconditioner.

U.S. Pat. No. 5,426,895 to Siciliano et al. discloses a windshield wiper blade cleaner.

U.S. Pat. No. Des. 322,922 to Swanson et al. discloses the ornamental design for a ski edge sharpener.

U.S. Pat. No. 4,617,765 to Weiler discloses a wiper blade edger.

U.S. Pat. No. 3,886,657 to Fabian discloses a windshield wiper sharpener.

U.S. Pat. No. 5,381,629 to Salvail discloses a portable sharpener.

While these devices fulfill their respective, particular objective and requirements, the aforementioned patents do not describe a resurfacing tool for reshaping and resurfacing edges of windshield wiper blades, squeegees, dustpans, and the like.

In this respect, the resurfacing tool according to the present invention substantially departs from the conventional concepts and designs of the prior art, and in doing so provides an apparatus primarily developed for the purpose of reshaping and resurfacing edges of windshield wiper blades, squeegees, dustpans, and the like.

Therefore, it can be appreciated that there exists a continuing need for new and improved resurfacing tool which can be used for reshaping and resurfacing edges of windshield wiper blades, squeegees, dustpans, and the like. In this regard, the present invention substantially fulfills this need.

SUMMARY OF THE INVENTION

In the view of the foregoing disadvantages inherent in the known types of windshield blade cleaners now present in the prior art, the present invention provides an improved resurfacing tool. As such, the general purpose of the present invention, which will be described subsequently in greater detail, is to provide a new and improved resurfacing tool and method which has all the advantages of the prior art and none of the disadvantages.

To attain this, the present invention essentially comprises a base member defined by a planar portion having a generally rectangular configuration. The planar portion has opposed short edges and opposed long edges. A pair of branched portions are integral with the opposed long edges of the planar portion of the base member. The pair of branched portions include a first branched portion and a second branched portion. The first branched portion has a short upper arm and an angular longer lower arm with a space disposed therebetween. The second branched portion has a short lower arm and an angular longer upper arm with a space disposed therebetween. A pair of emery cloths are secured within the spaces of the first and second branched portions. A first emery cloth is secured within the space of the first branched portion. The first emery cloth has a fine texture. A second emery cloth is secured within the space of the second branched portion. The second emery cloth has a medium texture. The device includes means for coupling the tool with a key chain. The means for coupling is defined by an aperture directed through the planar portion adjacent to one of the opposed short edges whereby a standard key chain can be manipulated so as to couple with the aperture.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved resurfacing tool which has all the advantages of the prior art windshield blade cleaners and none of the disadvantages.

It is another object of the present invention to provide a new and improved resurfacing tool which may be easily and efficiently manufactured and marketed.

It is a further object of the present invention to provide a new and improved resurfacing tool which is of durable and reliable construction.

An even further object of the present invention is to provide a new and improved resurfacing tool which is susceptible of a low cost of manufacture with regard to both materials and labor, and which accordingly is then susceptible of low prices of sale to the consuming public, thereby making such a resurfacing tool economically available to the buying public.

Even still another object of the present invention is to provide a new and improved resurfacing tool for reshaping and resurfacing edges of windshield wiper blades, squeegees, dustpans, and the like.

Lastly, it is an object of the present invention to provide a new and improved resurfacing tool including a base member defined by a planar portion having a generally rectangular configuration. The planar portion has opposed short edges and opposed long edges. A pair of branched portions are integral with the opposed long edges of the planar portion of the base member. A pair of emery cloths are secured within spaces of the pair of branched portions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
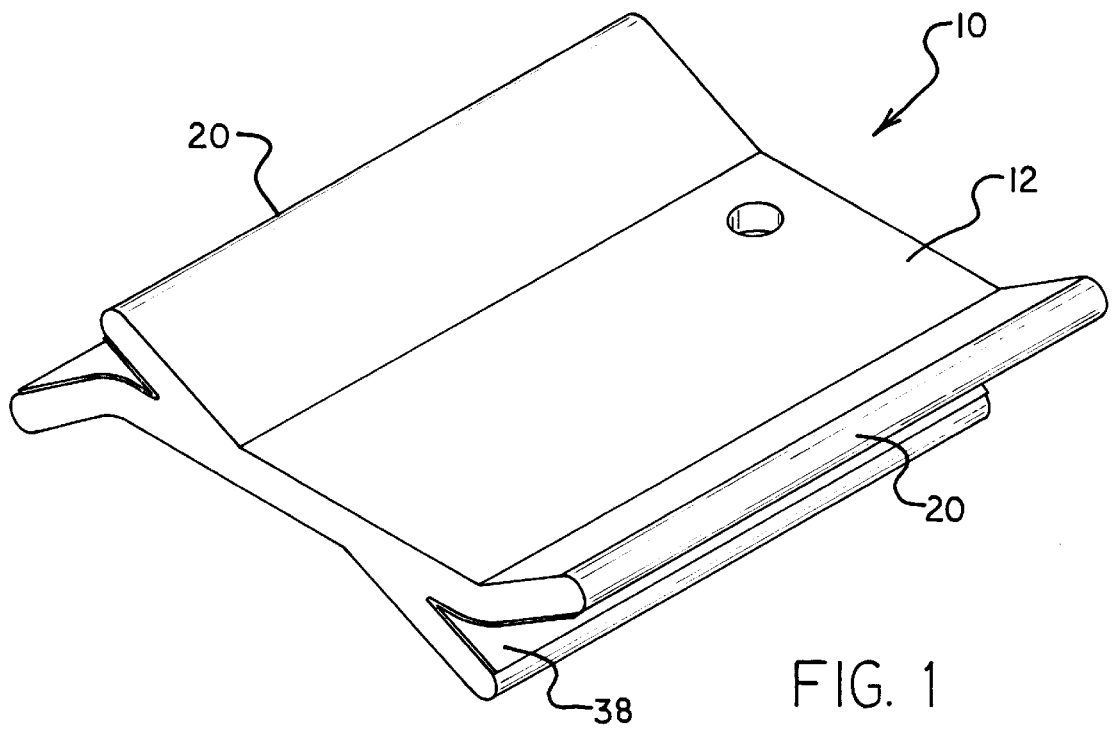
FIG. 1 is a perspective view of the preferred embodiment of the resurfacing tool constructed in accordance with the principles of the present invention.
Figure 2:
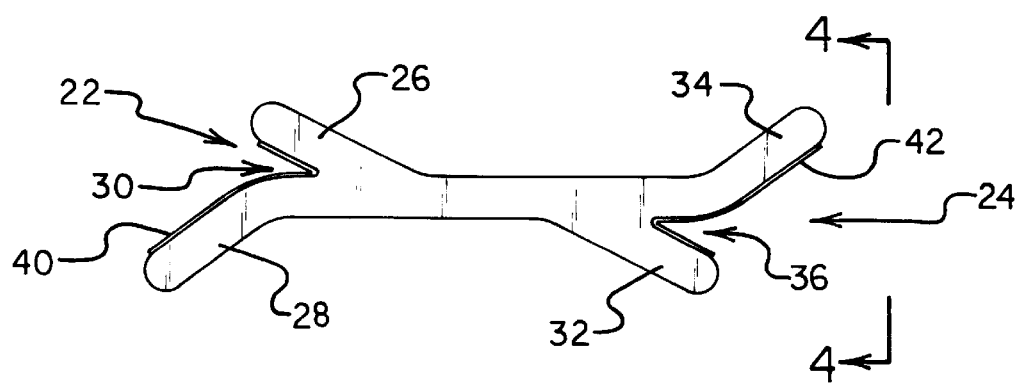
FIG. 2 is a front elevation view of the present invention.
Figure 3:
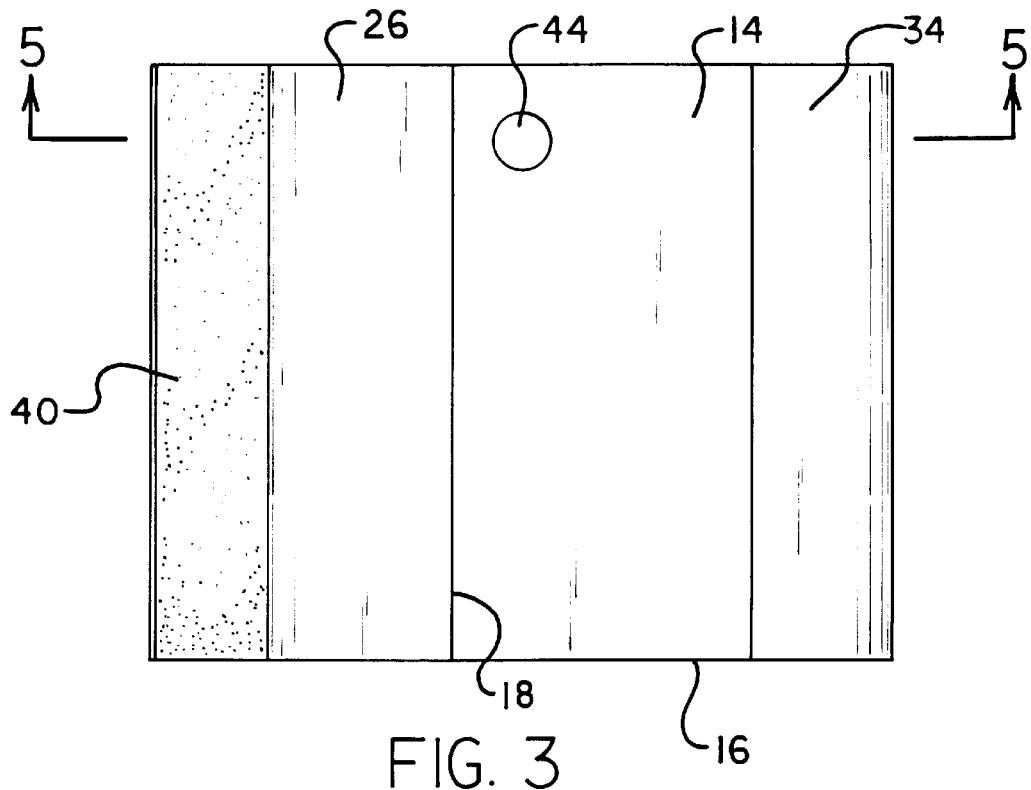
FIG. 3 is a top plan view of the present invention.
Figure 4:
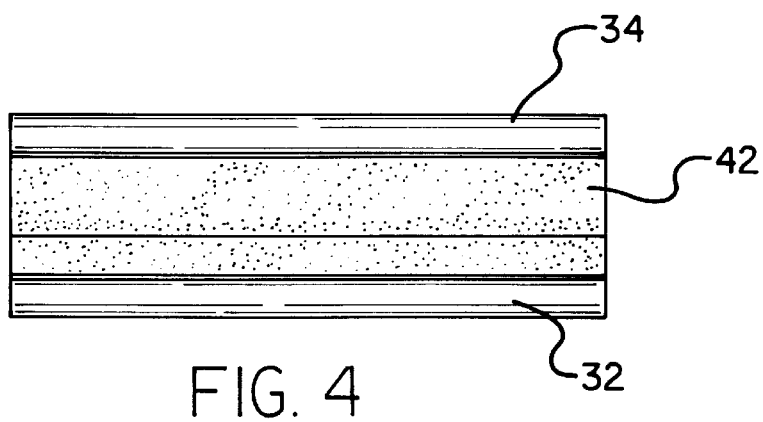
FIG. 4 is a side elevation view as taken along line 4—4 of FIG. 2.
Figure 5:
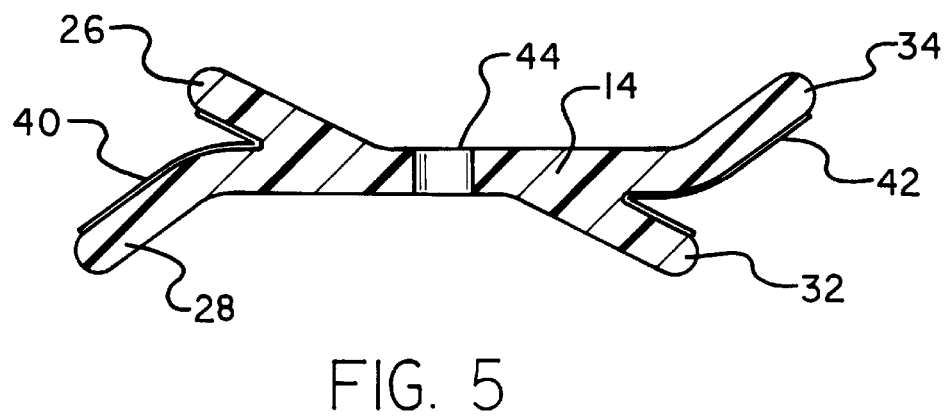
FIG. 5 is a cross-sectional view as taken along line 5—5 of FIG. 3.

With reference now to the drawings, and in particular, to FIGS. 1 through 5 thereof, the preferred embodiment of the new and improved resurfacing tool embodying the principles and concepts of the present invention and generally designated by the reference number 10 will be described.

Specifically, it will be noted in the various Figures that the device relates to a resurfacing tool for reshaping and resurfacing edges of windshield wiper blades, squeegees, dustpans, and the like. In its broadest context, the device consists of a base member, a pair of branched portions, a pair of emery cloths and means for coupling with a key chain. Such components are individually configured and correlated with respect to each other so as to attain the desired objective.

The device 10 includes a base member 12 defined by a planar portion 14 having a generally rectangular configuration. The planar portion 14 has opposed short edges 16 and opposed long edges 18. The base member 12 is preferably constructed of a molded plastic, such as polyethylene or a similar material that is low cost and easily manufactured.

A pair of branched portions 20 are integral with the opposed long edges 18 of the planar portion 14 of the base member 12. The pair of branched portions 20 include a first branched portion 22 and a second branched portion 24. The first branched portion 22 has a short upper arm 26 and an angular longer lower arm 28 with a space 30 disposed therebetween. The second branched portion 24 has a short lower arm 32 and an angular longer upper arm 34 with a space 36 disposed therebetween.

A pair of emery cloths 38 are secured within the spaces 30,36 of the first and second branched portions 22,24. A first emery cloth 40 is secured within the space of the first branched portion and extends along the arms 26,28 thereof. The first emery cloth 40 has a fine texture. A second emery cloth 42 is secured within the space 36 of the second branched portion 24. The second emery cloth 42 has a medium texture. The emery cloths allow for the wiper blade or other similar object to be wiped between the arms of the branched portions to remove the residue from the blade. The arrangement of the arms of the branched portions allows for the wiper blades to be completely contacted and thereby reconditioned. A system of use would having the wiper blade rubbed against the medium texture first followed by the fine texture to ensure the removal of unwanted particulate. The emery cloths 38 are secured to the branched portions via an adhesive.

The device 10 includes means for coupling the tool with a key chain. The means for coupling is defined by an aperture 44 directed through the planar portion 14 adjacent to one of the opposed short edges 16 whereby a standard key chain can be manipulated so as to couple with the aperture 44.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A resurfacing tool for reshaping and resurfacing edges of windshield wiper blades, squeegees, and dustpans comprising, in combination:

a base member defined by a planar portion having a generally rectangular configuration, the planar portion having opposed short edges and opposed long edges;

a pair of branched portions integral with the opposed long edges of the planar portion of the base member, the pair of branched portions including a first branched portion and a second branched portion, the first branched portion having a short upper arm and an angular longer lower arm with a space disposed therebetween, the second branched portion having a short lower arm and an angular longer upper arm with a space disposed therebetween;

a pair of emery cloths secured within the spaces of the first and second branched portions, a first emery cloth secured within the space of the first branched portion, the first emery cloth having a fine texture, a second emery cloth secured within the space of the second branched portion, the second emery cloth having a medium texture; and means for coupling the tool with a key chain, the means for coupling being defined by an aperture directed through the planar portion adjacent to one of the opposed short edges whereby a standard key chain can be manipulated so as to couple with the aperture.

2. A resurfacing tool for reshaping and resurfacing edges of windshield wiper blades, squeegees, and dustpans comprising:

a base member defined by a planar portion having a generally rectangular configuration, the planar portion having opposed short edges and opposed long edges;

a pair of branched portions integral with the opposed long edges of the planar portion of the base member, the pair of branched portions including a first branched portion and a second branched portion, the first branched portion having a short upper arm and an angular longer lower arm with a space disposed therebetween for receipt of the emery cloth, the second branched portion having a short lower arm and an angular longer upper arm with a space disposed therebetween for receipt of the emery cloth; and a pair of emery cloths secured within the spaces of the first and second branched portions.

3. The resurfacing tool as set forth in claim 2 and further including means for coupling the tool with a key chain.

4. The resurfacing tool as set forth in claim 3 wherein the means for coupling is defined by an aperture directed through the planar portion adjacent to one of the opposed short edges whereby a standard key chain can be manipulated so as to couple with the aperture.

5. A resurfacing tool for reshaping and resurfacing edges of windshield wiper blades, squeegees, and dustpans comprising:

a base member defined by a planar portion having a generally rectangular configuration, the planar portion having opposed short edges and opposed long edges;

a pair of branched portions integral with the opposed long edges of the planar portion of the base member, the pair of branched portions including a first branched portion and a second branched portion, the first branched portion having a short upper arm and an angular longer lower arm with a space disposed therebetween for receipt of the emery cloth, the second branched portion having a short lower arm and an angular longer upper arm with a space disposed therebetween for receipt of the emery cloth; and a pair of emery cloths secured within the spaces of the first and second branched portions wherein the pair of emery cloths include a fine textured cloth and a medium textured cloth.

* * * * *